United States Patent [19]
Barré et al.

[11] Patent Number: 5,897,277
[45] Date of Patent: Apr. 27, 1999

[54] SELF-LOCKING OBTURATING DEVICE

[75] Inventors: Bernard Barré, Alfortville; Jean-Pierre Marc, Nangis, both of France

[73] Assignee: JPB Systeme, Brie Comte Robert, France

[21] Appl. No.: 08/836,136

[22] PCT Filed: Nov. 7, 1995

[86] PCT No.: PCT/FR95/01461

§ 371 Date: May 5, 1997

§ 102(e) Date: May 5, 1997

[87] PCT Pub. No.: WO96/14516

PCT Pub. Date: May 17, 1996

[30] Foreign Application Priority Data

Nov. 8, 1994 [FR] France .................................. 94 13391

[51] Int. Cl.[6] ........................... F16B 39/10; F16B 39/24; F16B 39/32

[52] U.S. Cl. .......................... 411/331; 411/120; 411/150; 411/327

[58] Field of Search ................................ 411/7, 114, 115, 411/120, 331, 332, 330, 326, 329, 911, 136, 149, 150, 327

[56] References Cited

U.S. PATENT DOCUMENTS

| | | | |
|---|---|---|---|
| 1,082,389 | 12/1913 | Armstrong | 411/331 |
| 2,152,977 | 4/1939 | Schindel | 411/331 X |
| 2,997,090 | 8/1961 | Anderson | . |
| 3,669,472 | 6/1972 | Nadsady | 411/331 X |
| 3,866,878 | 2/1975 | Yamamoto | . |
| 4,512,697 | 4/1985 | Cascini | 411/911 X |
| 4,704,058 | 11/1987 | Crunwell | 411/149 X |
| 4,815,276 | 3/1989 | Hansel et al. | . |
| 5,533,849 | 7/1996 | Burdick | 411/120 |

FOREIGN PATENT DOCUMENTS

| | | | |
|---|---|---|---|
| 916792 | 3/1982 | U.S.S.R. | 411/136 |
| 863 147 | 3/1961 | United Kingdom | . |
| 1 579 730 | 11/1980 | United Kingdom | . |

*Primary Examiner*—Neill Wilson
*Attorney, Agent, or Firm*—Young & Thompson

[57] ABSTRACT

An obturating device including a body (11) with a recess (8) at one end engageable by a spanner, and a screw thread (2) at the other end for engaging a complementary screw thread (7) in an opening (6) of a housing (3). A locking ring (31) biased by a spring in the obturating device (1) and a complementary locking ring (47) in the opening have asymmetrical teeth which interlock when screwing-in is complete and snap together to prevent loosening of the rings. The tooth flanks that engage one another on loosening are nevertheless sufficiently angled to enable forced unscrewing using a spanner. A skirt (14) protects the mechanism and acts as an abutment in the fully screwed-in position. The obturating device enables locking and unlocking, requires no direct manual operation and is particularly suitable for endoscope insertion openings in aircraft engines.

97 Claims, 2 Drawing Sheets

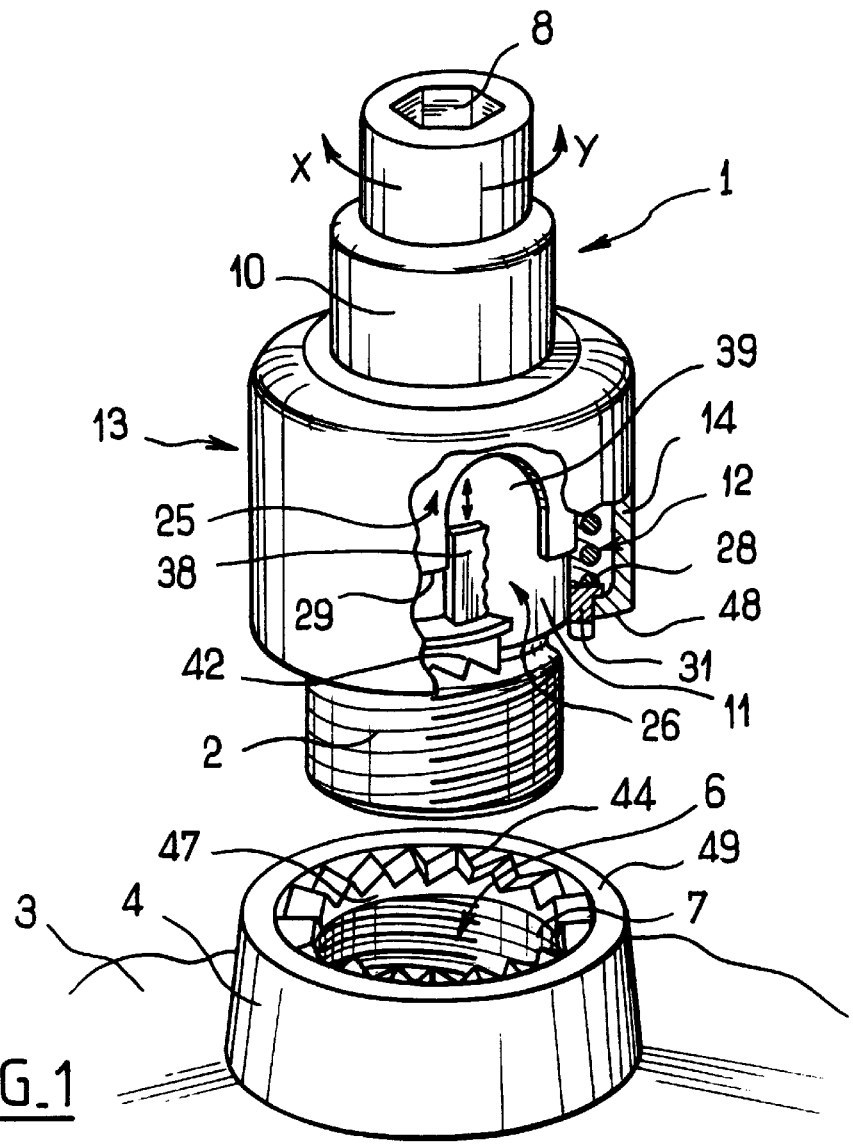
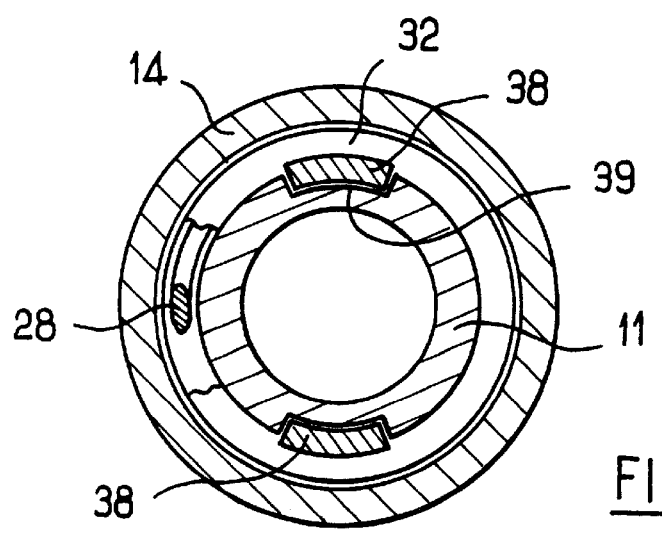

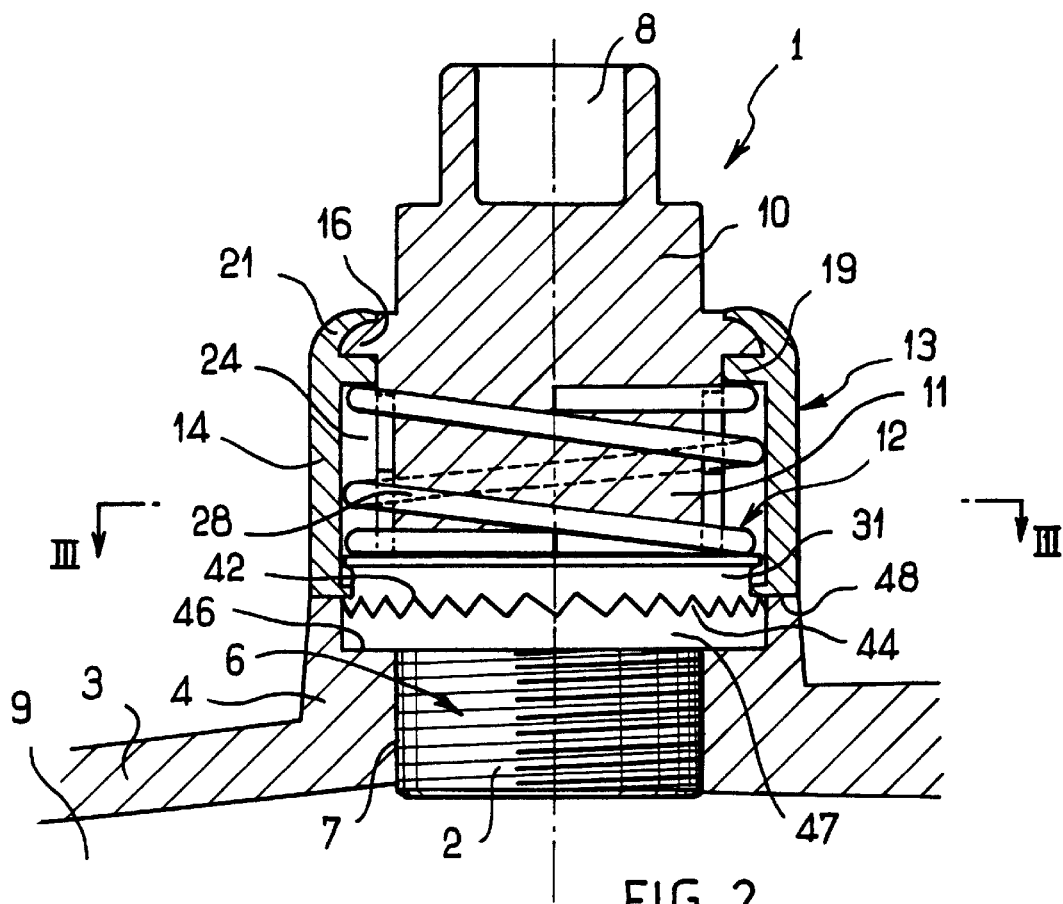
FIG._2
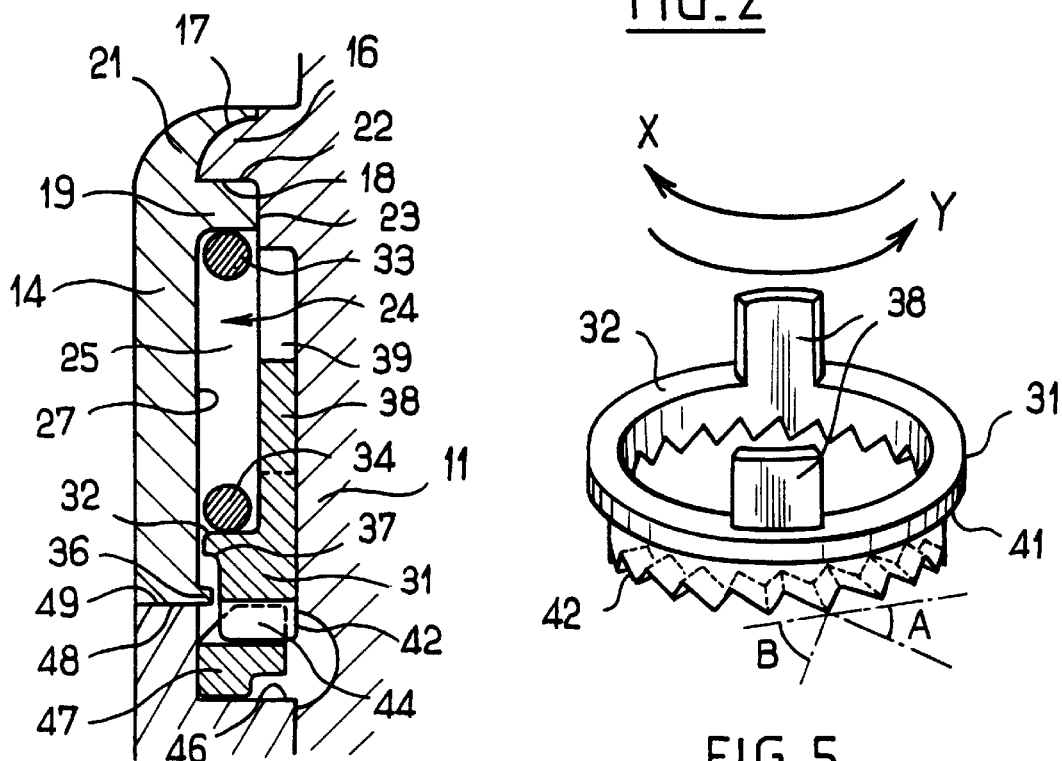
FIG._4
FIG._5

SELF-LOCKING OBTURATING DEVICE

BACKGROUND OF THE INVENTION

The present invention relates to an obturating device comprising a plug which automatically locks when screwed in thus preventing spontaneous unscrewing.

DESCRIPTION OF THE RELATED ART

In aeronautics, an aircraft engine requires regular maintenance and very rigorous inspection examinations in order to ensure the perfect reliability of the engine during its operation. In order to be able to inspect the internal parts and their possible wear, orifices are provided in the engine casing. During maintenance operations, a plug obturating the orifice is unscrewed and an endoscope can be inserted in order to examine internal cavities and to observe the state of the engine parts. In this way the opening of the casing and the complete dismantling of the engine are avoided.

The commonly used plugs of this type, also called "endoscope plugs" have a thread and they are screwed by means of a torque wrench into the casing which has a corresponding thread.

When the engine is running, its functioning generates vibrations which can cause the loosening of screwed parts and more particularly the loosening of the endoscope plugs.

Various means are of course known to prevent such damage. These means can consist in placing an added part in contact with the plug, before or after tightening. The parts used are of the lock washer type, or of the locking pin or locking wire type.

However, the accessibility of the plugs in an engine can be very bad because pipes and other peripheral devices clutter the space around the casing. Thus the positioning of an additional locking part on a plug requires great dexterity and even luck in order to avoid losing the said part. In certain cases, the plug is accessible only with the help of a long tool, any direct manual access to the plug is even impossible when the plug is in place. Locking systems are also known which could be permanently mounted on the plug. But these locking systems are not totally reliable, especially after several screwing and unscrewing operations.

U.S. Pat. No. 2,997,090 describes a device for locking a threaded rod in any position with respect to a tapped bore, the free end of the said rod forming an adjustable stop. A locking ring surrounding the rod comprises a pin engaged in an axial groove of the rod. This ring, which is thus connected to the rod in rotation, comprises a toothed face. A spring pushes the ring towards a shoulder integral with the bore and comprising complementary teeth. Thus, whatever the position of the rod in the bore may be, the ring locks the rod with respect to the bore. In order to make an adjustment, there is applied to the rod a rotational torque which is sufficient to cause the teeth of the ring to clear the teeth of the shoulder, with the simultaneous and spontaneous compression of the spring. This device would not be suitable for locking a plug because it would make a complete rotation manoeuvre over several turns in order to screw and unscrew the plug very awkward and difficult, particularly if the latter has poor access. Furthermore, this device would eliminate, at least partially, the sensation of tightening the plug, thus giving rise to a serious risk of defective closure of the plug, particularly in the case of poor accessibility.

SUMMARY OF THE INVENTION

The purpose of the invention is to overcome these disadvantages by proposing an obturating device comprising a stop system, opposing any accidental unscrewing under the effect of vibrations produced in particular by an engine such as an aircraft engine, which is directly integrated with the obturating device, and which is not a hindrance or a risk to opening and closing operations, even in the case of poor accessibility.

According to the invention, the obturating device comprising a plug intended to be placed on an orifice or to be removed from it, by screwing and unscrewing respectively, comprising a body carrying a thread and stop means opposing the spontaneous unscrewing of the plug, is characterized in that the said means are locking and unlocking means which are activated automatically by the rotation of the plug and its corresponding progression in the direction of the axis.

Thus, during the movement of the plug towards the closed position and away from the latter, the respective locking and unlocking means are progressively brought into action, in a way which is concomitant with the movement, without there being any intervention by the operator.

Preferably, the locking means are of the reversible ratchet engagement type designed such that, starting from a screwed in and locked state of the plug, the torque necessary for unlocking in the unscrewing direction is greater than the torque necessary to overcome the ratchet engagement in the sense of additional screwing in of the plug. The term "reversible ratchet engagement" is understood to mean a ratchet type engagement which can be released by the application of a sufficient force on the plug in the unscrewing direction.

In a particularly advantageous manner, the locking and unlocking are provided by a ratchet device comprising a moving part integral with the plug and a ring fixed to the casing, both parts having a toothed profile.

In order to prevent accidental unscrewing due to vibrations and to allow the deliberate loosening of the plug by the operator, the toothed profile of the moving part is applied by a spring against the identical toothed profile of the ring attached to the casing. The result of this is that the teeth mesh with one another and this opposes the spontaneous rotation of the plug.

Furthermore, during the fitting or removing operation, the operator feels the ratcheting of the device and can therefore be reassured of the correct functioning of the locking system.

BRIEF DESCRIPTION OF THE DRAWINGS

Other features and advantages of the invention will furthermore emerge from the following description relating to non-limitative examples. In the accompanying drawings:

FIG. 1 is a view of an obturating device with tear-away Sections and is a partially cross-sectional view;

FIG. 2 is a view of the obturating device shown in FIG. 1 placed on an engine casing, with a partial cross-section, showing the locking and unlocking means;

FIG. 3 is a transverse cross-sectional view along the direction III—III shown in FIG. 2;

FIG. 4 is an axial cross-sectional view of a part of the locking and unlocking means; and FIG. 5 is a perspective view of the movable toothed locking member.

DESCRIPTION OF THE PREFERRED EMBODIMENTS

In the example shown in the figures, the endoscope plug 1 is of generally circular shape and comprises a central body 11 rigidly carrying a male threaded part 2 at its base. The endoscope plug is screwed by means of its threaded part 2 into a complementary female thread 7 formed in the wall of an orifice 6 formed through a boss 4 of the engine casing 3. The threads 2 and 7 are standard and, in particular, have no interruptions of the type of an axial groove or of a flat portion.

At its end opposite to that of the threaded part 2, the central body 11 rigidly carries an end-piece 10 provided with a recess 8 for receiving the head of a wrench for screwing and unscrewing the plug. A predetermined tightening torque can be provided by using a torque wrench.

During maintenance operations, the endoscope plug is unscrewed and an endoscope (not shown) can be inserted through the orifice 6 into the cavity 9 in order to inspect the internal parts of the engine.

Locking and unlocking means 12 and protection means 13 are arranged around the central body 11.

The protection means comprise a cylindrical protective skirt 14 fitted by crimping around the central body 11 of the endoscope plug. For this purpose, the central body 11 has a collar 16 (FIGS. 2 and 4) protruding outwards and close to the end piece 10 at a certain axial distance from the threaded section 2.

The collar 16 (FIG. 4) is delimited at the end nearest the threaded section 2 by a shoulder 18 and at the other end by a surface 17 having an arc-of-circle section.

The skirt 14 has on its inside surface, in the region of its crimping end directed towards the recess 8, an annular rib 19 of square cross-section, forming a shoulder 22 on the side facing the recess 8. Beyond this rib 19, the skirt 14 is terminated with a crimping lip 21.

The crimping is carried out firstly by placing the shoulder 22 of the rib 19 against the straight shoulder 18 of the collar 16 of the central body, in such a way that the radially internal face 23 of the rib 19 is centred against the peripheral surface of the central body 11.

Then, the lip 21 is folded down by plastic deformation against the arc-of-circle surface 17 of the collar 16 in such as way as to crimp the skirt 14 definitively on the central body 11 of the plug. The skirt 14 is therefore rendered rigidly integral with the body 11.

An annular housing 24 is defined between the outer surface of the central body 11 and the inner surface 27 of the skirt 14. The housing 24 extends axially between the rib 19 of the skirt and a free edge 48 which terminates the skirt 14 at its end remote from the crimping end. The free edge 48 is located substantially in the same plane perpendicular to the axis as that of the junction between the body 11 and the threaded section 2. The housing 24 is open at the free edge 48 and closed at the crimped end of the skirt 14. When the plug is in the state in which it is screwed into the orifice, the free edge 48 of the skirt 14 serves as a screwing stop by bearing on a flat annular surface 49 provided on the boss 4 around the orifice 6.

During this bearing against the stop, the tightening force on the plug, resulting from the screwing, is transmitted from the collar 16 to the rib 19 by the mutual bearing of the shoulders 18 and 22, and from the free edge 48 of the skirt 14 to the flat annular face 49 of the casing. The skirt 14 therefore functions as a tubular spacer between the central body 11 and the casing.

The recess 8 is blind and does not therefore provide any access to the inside of the plug. Furthermore, the crimping by the lip 21 of the skirt 14 on the body 11 is substantially a sealing arrangement, as is the bearing of the free edge 48 on the flat annular surface 49 when the plug is screwed in. Thus, when the plug is screwed in, the inside of the plug and in particular the housing 24 are protected from pollution and fouling.

The central body 11 has on its peripheral surface surrounded by the skirt 14, a shoulder 29 facing the threaded section 2. The shoulder 29 radially delimits, in the housing 24, a first relatively narrow region 25, and a second region 26 which is radially wider and more distant from the crimping of the skirt 14.

The locking and unlocking means 12 are placed in the internal space of the plug, which is closed as just described when the plug is in position, and in particular in the housing 24.

The locking and unlocking means 12 comprise a ring 31 mounted in an axially sliding manner around the central body 11 and inside the second region 26 of the housing 24. The ring 31 has an internal diameter and an external diameter substantially equal to those of the second region 26 of the housing 24 respectively.

The locking and unlocking means 12 furthermore comprise a coil compression spring 28 placed in the housing 24 around the central body 11. It bears at one end 33 against the rib 19 of the skirt 14 and at the other end 34 against the ring 31.

The diameter of the wire of the spring is very slightly less than the radial dimension of the first region 25 of the housing 24.

The ring 31 and the spring 28 are trapped in the assembly formed by the central body 11 and the skirt 14, even when the plug is separated from the orifice 6. To achieve this, the skirt 14 comprises along its free edge 48 an internal annular rim 36 serving as a stop for a shoulder 37 of the ring 31 (FIG. 4). When the plug 1 is separated from the orifice 6, the spring 28 retains the ring 31 bearing against the rim 36 with its shoulder 37.

In order to prevent the ring 31 from turning with respect to the central body 11, the ring 31 rigidly carries two diametrically opposed flat retaining keys 38 which are oriented axially towards the end piece 10 and therefore towards the inside of the housing 24 starting from a face 32 of the ring 31 on which the spring 28 bears.

These two keys 38 are adjacent to the inside periphery of the ring 31 and their radial thickness is equal to that of the shoulder 29. They can thus extend inside the spring 28 without interfering with the coils of the latter. They slide in two corresponding grooves 39 (FIGS. 1 and 2) formed in the outside face of the central body 11 in the form of notches starting from the shoulder 29 and running towards the end piece 10, and therefore along the first region 25 of the housing 24. The grooves 39 have the same radial depth as the shoulder 29.

The ring 31 has on its face 41 facing the outside of the housing 24 a set of regular teeth 42, of equal height, disposed around the whole of the periphery of the ring 31. The set of teeth 42 has an external diameter less than the internal diameter of the rim 36 of the skirt 14. This allows the teeth 42 to protrude axially out of the housing 24 when the ring 31 is abutted against the rim 36.

The teeth of the set of teeth 42 are of asymmetrical shape. As shown more precisely in FIG. 5, each tooth has, with respect to the screwing-in direction X, a forward face making, with respect to a radial plane, an angle A which is less than the angle B formed by a trailing face of the same tooth with respect to the same plane.

The angles A and B are for example approximately 30° and 45°. Because the two angles A and B are different, the teeth have one long face and one shorter face.

On the casing 3, the locking means 12 comprise an identical set of teeth 44 facing axially towards the outside of the orifice 6. The set of teeth 44 is formed on a ring 47, of size substantially equal to the ring 31, fitted in a fixed manner in a recess 46 formed in the boss 4 around the orifice 6. The apexes of the teeth 44 are substantially in the plane of the face 49, which surrounds the set of teeth.

The ring 47 can have on its outside face roughness such as notches or grooves (not shown) making it possible to obtain strong attachment to the casing 3 after an assembly by force fitting into the clearance 46 using a drift or a mallet. The toothed ring 47 does not require any modification of the casing because the recess 46 is provided in any case.

The operation of the device is as follows:

When the plug is separated from the casing 3, the locking mechanism is protected mechanically, on the one hand by the skirt 14 and on the other hand by the periphery of the boss 4 which surrounds the ring 47.

The user places the endoscope plug 1 on the boss 4 of the casing 3 and starts to screw it in, if necessary using a torque wrench.

After a certain number of turns in the direction X, when the ring 31 abuts against the rim 36, the set of teeth 42 reaches the identical set of teeth 44 of the ring 47 attached to the casing. The teeth of the sets of teeth 42 and 44 come into contact with each other by their less inclined faces (inclination A) which form ramps pushing the set of teeth 42 towards the inside of the housing 24, with compression of the coil spring 28.

The spring 28, becoming increasingly compressed, increasingly pushes the sliding ring 31 axially towards the fixed ring 47. A clicking reassures the user that the locking system is working correctly.

During the tightening, the ramp effect produced by the faces of slope A, for example equal to 30°, has little effect on the tightening torque which was predetermined from the outset.

The final tightening is produced when the free edge 48 of the skirt 14 is tightened against the tightening face 49 of the boss 4 of the casing. The skirt 14 then functions as a spacer between the boss 4 of the casing and the central body 11 by bearing on the tightening face 49 and on the collar 16 of the central body 11. The skirt 14 then protects the mechanism from any pollution and furthermore affords a sealing effect to the plug 1.

The locking is therefore produced by ratchet engagement, each tooth of the set of teeth 42 behaving like a pawl with respect to the set of teeth 44. The ratchet engagement process begins solely because of the rotation of the plug and of its corresponding axial progression towards the casing, without necessitating any specific operation by the user. Subsequently, any accidental loosening of the plug is prevented, even when subjected to vibrations.

The effectiveness of the locking is virtually independent of the tightening torque. It results from the mutual bearing against one another of the highly inclined faces (inclination B) of the teeth of the set of teeth 42 and the equivalent faces of the teeth of the set of teeth 44. But as the inclination of these teeth is nevertheless much less than 90°, the locking by ratchet engagement is reversible, that is to say that unlocking is possible by applying a torque on the plug in the unscrewing direction Y. This torque is much higher than that which was necessary in order to overcome the resistance of the locking means in the sense of additional screwing force during the screwing in operation. Apart from this, the unlocking operates in a way similar to that of the screwing with the teeth of the sets of teeth 42 and 44 mutually clearing each other, each time with compression of the spring 28.

The endoscope plug has the additional advantages of not requiring lubricants and of being easily removable and repairable without having to dismantle the whole of the engine.

In order to manufacture the plug, the spring 28 and the ring 31 are fitted in the skirt 14, then a subassembly is made therewith by forming the rim 36 of the skirt 14, by means of a plastic deformation of the free edge 48. Then the said subassembly is assembled with the central body 11 by crimping the lip 21. The device according to the invention is applicable without any modification of standards, in particular those applicable to aviation. The threads remain standard.

The invention is not of course limited to the examples described and shown.

The tooth profile of the sets of teeth chosen for the rings 31 and 47 can be modified. If desired, it is possible to increase or reduce the angle of 30° for the screwing and the angle of 45° for the unscrewing.

The tightening torque and the loosening torque can be varied by changing the spring 28, by increasing or reducing the slopes of the teeth and by changing the coefficient of friction of the materials in contact.

The travel of the moving device can be variable as required.

Welds can furthermore be used instead of crimpings.

The invention would be applicable to a plug comprising a female thread intended to cooperate with an externally threaded boss.

We claim:

1. An obturating device comprising:
   a plug intended to be placed in a threaded orifice or to be removed therefrom by screwing and unscrewing respectively, said plug comprising a plug body carrying a thread;
   a first releasable locking member;
   connecting means spaced apart from a cylinder along which said thread is formed for making said first locking member integral in rotation with said plug body;
   a second releasable locking member which is integral in rotation with the orifice;
   wherein said first and second releasable locking members form together a plug locking and unlocking means which is a reversible ratchet engagement means and is automatically activated by rotation of the plug with respect to the orifice and corresponding progression thereof in an axial direction of the thread with respect to the orifice.

2. An obturating device according to claim 1, wherein the second locking member integral in rotation with the orifice is a ring fixed in a recess formed around the orifice.

3. An obturating device according to claim 1, wherein the plug comprises a skirt of which, when the plug is screwed in, a free edge comes into a substantially sealing contact with a peripheral region of the orifice in such a way as to enclose the locking and unlocking means.

4. An obturating device according to claim 1, wherein at least one of the locking members comprises an annular set of teeth which are oriented substantially axially.

5. An obturating device according to claim 1, wherein, when the plug is in the locked and screwed-in state, the reversible ratchet engagement means define, by their axial meshing, a first mutual bearing opposing spontaneous unscrewing by mutual engagement of two contact faces inclined at a first angle which is relatively large, but less than 90°, with respect to a radial plan, and a second mutual bearing, tending to oppose additional screwing, by mutual engagement of two ramps inclined at a second angle with respect to the radial plane and which is smaller than the first angle.

6. An obturating device according to Claim 1, wherein said first and second locking members are positioned such that they mesh with one another axially when the plug closes the orifice under the thrust of a return means urging one of these locking members in the direction of the other.

7. An obturating device according to claim 6, wherein the reversible ratchet engagement means are designed such that, starting from a screwed-in state of the plug, the torque to be applied to the plug in order to unlock it by unscrewing is greater than the torque to be applied in order to unlock it in the sense of an additional screwing.

8. An obturating device according to claim 6, wherein said one locking member, forced by the return means, is guided with respect to the thread with which it is associated by guidance means which are located apart from the said associated thread.

9. An obturating device according to claim 6, wherein said return means is borne by the plug and applies an axial force towards the inside of the orifice on said first locking member which is integral in rotation with the plug.

10. An obturating device according to claim 9, wherein the first locking member is slidingly guided over a body of the plug, with which the thread is integral, the body and the first locking member being furthermore provided with means of mutual connection in rotation.

11. An obturating device according to claim 10, wherein the body of the plug is axially aligned with a male threaded part provided with the thread, such that the body is outside of the orifice when the plug is in the closed position with respect to the orifice.

12. An obturating device according to claim 10, wherein the return means is a coil spring fitted around the body between a shoulder and the first locking member and wherein said first locking member is ring-shaped.

13. An obturating device according to claim 10, wherein for its sliding guidance and its rotational connection, the first locking member comprises, at an end thereof which is remote from the orifice, keys engaged in grooves formed in the body.

14. An obturating device according to claim 9, wherein the plug comprises a skirt externally surrounding the first locking member and the return means, and wherein the skirt has a radially inwardly directed rim limiting axial translation, under the thrust of the return means, of the first locking member.

15. An obturating device according to claim 14, wherein, when the plug is screwed in, a free edge of the skirt comes into a substantially sealing contact with a peripheral region of the orifice thereby enclosing the locking and unlocking means.

16. An obturating device according to claim 14, wherein the rim is produced by plastically deforming the free edge of the skirt after fitting the return means against an end shoulder of the skirt followed by fitting of the first locking member in such a way as to form a subassembly which is then attached to a central body of the plug by an end of the skirt which is remote from its free end.

17. An obturating device according to claim 14, wherein a free edge of the skirt is tightened in abutment against the peripheral region of the orifice when the plug is in the screwed-in state.

18. An obturating device according to claim 14, wherein the thread is a male thread and the locking and unlocking means are arranged in an annular cavity between the skirt and a central body of the plug, carrying the thread.

19. An obturating device according to claim 18, wherein the skirt is mounted onto the body and has, in order to transmit to the body the force of application of the free edge of the skirt against the peripheral region of the orifice, a shoulder facing away from the free edge and bearing against a corresponding shoulder of the body, in such a way that the skirt functions as a tubular spacer between the shoulder of the body and the peripheral region of the orifice.

20. An obturating device according to claim 19, wherein the shoulder of the body is part of a collar folded down over the collar on the side remote from the shoulder of the body.

21. An obturating device comprising a plug intended to be placed on a threaded orifice or to be removed therefrom, by screwing and unscrewing respectively, comprising a body carrying a thread and reversible ratchet engagement means opposing spontaneous unscrewing of the plug, said reversible ratchet engagement means being activated automatically by rotation of the plug and its corresponding progression in an axial direction of the thread, wherein said reversible ratchet engagement means comprise two locking members, which are integral in rotation with the plug and with the orifice respectively, and wherein these two locking members are positioned such that they axially mesh with one another when the plug closes the orifice, under a thrust produced by a return means urging a first of these locking members towards the other, and wherein the reversible ratchet engagement means are designed such that, starting from a screwed-in state of the plug, unlocking of the plug requires a greater torque to be applied to the plug in a direction of unscrewing than in a direction of additional screwing.

22. An obturating device according to claim 21, wherein when the plug is in the locked and screwed-in state, the reversible ratchet engagement means define, by their axial meshing, a first mutual bearing opposing spontaneous unscrewing by mutual engagement of two contact faces inclined at a first angle which is relatively large, but less than 90°, with respect to a radial plane, and a second mutual bearing, tending to oppose additional screwing, by mutual engagement of two ramps inclined at a second angle with respect to the radial plane and which is smaller than the first angle.

23. An obturating device according to claim 21, wherein at least one of the locking members comprises an annular set of teeth which are oriented substantially axially.

24. An obturating device according to claim 21, wherein said first locking member, forced by the return means, is guided with respect to the thread with which it is associated by guidance means which are located apart from the said associated thread.

25. An obturating device according to claim 21, wherein the return means is borne by the plug and applies an axial force towards the inside of the orifice on the locking member which is integral in rotation with the plug.

26. An obturating device according to claim 25, wherein the first locking member is slidingly guided over the body of the plug, with which the thread is integral, the body and the first locking member being furthermore provided with means of mutual connection in rotation.

27. An obturating device according to claim 26, wherein the body of the plug is axially aligned with a male threaded portion provided with the thread, such that the body is outside of the orifice when the plug is in the closed position with respect to the orifice.

28. An obturating device according to claim 26, wherein the return means is a coil spring fitted around the body between a shoulder and the first locking member, and wherein said first locking member is ring-shaped.

29. An obturating device according to claim 26, wherein for its sliding guidance and its rotational connection, the first locking member comprises, at an end remote from the orifice, keys engaged in grooves formed in the body.

30. An obturating device according to claim 25, wherein the plug comprises a skirt externally surrounding the first locking member and the return means, and wherein the skirt has a radially inwardly directed rim limiting axial translation, under the thrust of the return means, of the first locking member.

31. An obturating device according to claim 30, wherein, when the plug is screwed in, a free edge of the skirt comes into a substantially sealing contact with a peripheral region of the orifice in such a way as to enclose the locking members.

32. An obturating device according to claim 30, wherein the rim is produced by plastically deforming a free edge of the skirt after fitting the return means against an end shoulder of the skirt followed by fitting of the first locking member in such a way as to form a subassembly which is then attached to a central body of the plug by an end of the skirt which is remote from its free edge.

33. An obturating device according to claim 21, wherein the plug comprises a skirt of which, when the plug is screwed in, a free edge comes into a substantially sealing contact with a peripheral region of the orifice in such a way as to enclose the locking members.

34. An obturating device according to claim 30, wherein a free edge of the skirt is tightened in abutment against a peripheral region of the orifice when the plug is in the screwed-in state.

35. An obturating device according to claim 30, wherein the thread is a male thread and the locking members are arranged in an annular housing between the skirt and a central portion of the plug carrying the thread.

36. An obturating device according to claim 35, wherein the skirt is mounted onto the body and has, in order to transmit to the body the force of application of the free edge of the skirt against the peripheral region of the orifice, a shoulder facing away from the free edge and bearing against a corresponding shoulder of the body, whereby the skirt functions as a tubular spacer between the shoulder of the body and the peripheral region of the orifice.

37. An obturating device according to claim 36, wherein the shoulder of the body is part of a collar and the skirt has a crimping lip folded down over the collar on a side thereof which is remote from the shoulder of the body.

38. An obturating device according to claim 21, wherein the locking member integral in rotation with the orifice is a ring fixed in a recess formed around the orifice.

39. An obturating device comprising a plug intended to be placed on a threaded orifice or to be removed therefrom, by screwing and unscrewing respectively, comprising a body carrying a thread and reversible ratchet engagement means opposing spontaneous unscrewing of the plug, which are activated automatically by rotation of the plug and its corresponding progression in an axial direction of the thread, wherein said reversible ratchet engagement means comprise two locking members, which are integral in rotation with the plug and with the orifice respectively, and wherein these two locking members are positioned such that they axially mesh with one another when the plug closes the orifice, under a thrust produced by a return means urging a first of these locking members towards the other, and wherein when the plug is in the locked and screwed-in state, the reversible ratchet engagement means define, by their axial meshing, a first mutual bearing opposing spontaneous unscrewing by mutual engagement of two contact faces inclined at a first angle which is relatively large, but less than 90°, with respect to a radial plane, and a second mutual bearing, tending to oppose additional screwing, by mutual engagement of two ramps inclined at a second angle with respect to the radial plane, said second angle being smaller than the first angle.

40. An obturating device according to claim 39, wherein at least one of the locking members comprises an angular set of teeth which are oriented substantially axially.

41. An obturating device according to claim 39, wherein said first locking member, forced by the return means, is guided with respect to the thread with which it is associated by guidance means which are located apart from the said associated thread.

42. An obturating device according to claim 39, wherein the return means is borne by the plug and applies an axial force towards the inside of the orifice on the first locking member.

43. An obturating device according to claim 42, wherein the first locking member is slidingly guided over the body of the plug, with which the thread is integral, the body and the first locking member being furthermore provided with means of mutual connection in rotation.

44. An obturating device according to claim 43, wherein the body of the plug is axially aligned with a male threaded portion provided with the thread, such that the body is outside of the orifice when the plug is in the closed position with respect to the orifice.

45. An obturating device according to claim 43, wherein the return means is a coil spring fitted around the body between a shoulder and the first locking member, and wherein said first locking member is ring-shaped.

46. An obturating device according to claim 43, wherein for its sliding guidance and its rotational connection, the first locking member comprises, at an end remote from the orifice, keys engaged in grooves formed in the body.

47. An obturating device according to claim 42, wherein the plug comprises a skirt externally surrounding the locking member integral with the plug and the return means, and wherein the skirt has a radially inwardly directed rim limiting axial translation, under the thrust of the return means, of the first locking member.

48. An obturating device according to claim 47 wherein, when the plug is screwed in, a free edge of the skirt comes into a substantially sealing contact with a peripheral region of the orifice in such a way as to enclose the locking members.

49. An obturating device according to claim 47, wherein the rim is produced by plastically deforming a free edge of the skirt after fitting the return means against an end shoulder of the skirt followed by fitting of the first locking member in such a way as to form a subassembly which is then attached to a central body of the plug by an end of the skirt which is remote from its free edge.

50. An obturating device according to claim 39, wherein the plug comprises a skirt of which, when the plug is screwed in, a free edge comes into a substantially sealing contact with a peripheral region of the orifice in such a way as to enclose the locking members.

51. An obturating device according to claim 47, wherein a free edge of the skirt is tightened in abutment against a peripheral region of the orifice when the plug is in the screwed-in state.

52. An obturating device according to claim 47, wherein the thread is a male thread and the locking members are arranged in an annular housing between the skirt and a central threaded portion of the plug, carrying the thread.

53. An obturating device according to claim 52, wherein the skirt is mounted onto the body and has, in order to transmit to the body the force of application of the free edge of the skirt against the peripheral region of the orifice, a shoulder facing away from the free edge and bearing against a corresponding shoulder of the body, whereby the skirt functions as a tubular spacer between the shoulder of the body and the peripheral region of the orifice.

54. An obturating device according to claim 53, wherein the shoulder of the body is part of a collar and the skirt has a crimping lip folded down over the collar on a side thereof which is remote from the shoulder of the body.

55. An obturating device according to claim 39, wherein the locking member integral in rotation with the orifice is a ring fixed in a recess formed around the orifice.

56. An obturating device comprising a plug intended to be placed on a threaded orifice or to be removed therefrom, by screwing and unscrewing respectively, comprising a body carrying a thread and reversible ratchet engagement means opposing spontaneous unscrewing of the plug, which are activated automatically by rotation of the plug and its corresponding progression in an axial direction of the thread, wherein said reversible ratchet engagement means comprise two locking members, which are integral in rotation with the plug and with the orifice respectively, and wherein these two locking members are positioned such that they axially mesh with one another when the plug closes the orifice, under a thrust produced by a return means urging a first of these locking members towards the other, wherein the return means is borne by the plug and applies an axial force towards the inside of the orifice on the locking member which is integral in rotation with the plug, wherein the plug comprises a skirt externally surrounding the locking member integral with the plug and the return means, and wherein the skirt has radially inwardly directed rim limiting axial translation, under the thrust of the return means, of the locking member integral in rotation with the plug.

57. An obturating device according to claim 56, wherein when the plug is in the locked and screwed-in state, the reversible ratchet engagement means define, by their axial meshing, a first mutual bearing opposing spontaneous unscrewing by mutual engagement of two contact faces inclined at a first angle which is relatively large, but less than 90°, with respect to a radial plane, and a second mutual bearing, tending to oppose additional screwing, by mutual engagement of two ramps inclined at a second angle with respect to the radial plane, said second angle being smaller than the first angle.

58. An obturating device according to claim 56, wherein at least one of the locking members comprises an annular set of teeth which are oriented substantially axially.

59. An obturating device according to claim 56, wherein said first locking member, forced by the return means, is guided with respect to the thread with which it is associated by guidance means which are located apart from the said associated thread.

60. An obturating device according to claim 56, wherein the first locking member is slidingly guided over the body of the plug, with which the thread is integral, the body and the first locking member being furthermore provided with means of mutual connection in rotation.

61. An obturating device according to claim 60, wherein the body of the plug is axially aligned with a male threaded portion provided with the thread, such that the body is outside of the orifice when the plug is in the closed position with respect to the orifice.

62. An obturating device according to claim 60, wherein the return means is a coil spring fitted around the body between a shoulder and the first locking member, and wherein said first locking member is ring-shaped.

63. An obturating device according to claim 60, wherein for its sliding guidance and its rotational connection, the first locking member comprises, at an end remote from the orifice, keys engaged in grooves formed in the body.

64. An obturating device according to claim 56 wherein, when the plug is screwed in, a free edge of the skirt comes into a substantially sealing contact with a peripheral region of the orifice in such a way as to enclose the locking members.

65. An obturating device according to claim 56, wherein the rim is produced by plastically deforming a free edge of the skirt after fitting the return means against an end shoulder of the skirt followed by fitting of the first locking member in such a way as to form a subassembly which is then attached to a central body of the plug by an end of the skirt which is remote from its free edge.

66. An obturating device according to claim 56, wherein the plug comprises a skirt of which, when the plug is screwed in, a free edge comes into a substantially sealing contact with a peripheral region of the orifice in such a way as to enclose the locking members.

67. An obturating device according to claim 56, wherein a free edge of the skirt is tightened in abutment against a peripheral region of the orifice when the plug is in the screwed-in state.

68. An obturating device according to claim 56, wherein the thread is a male thread and the locking members are arranged in an annular housing between the skirt and a central threaded portion of the plug, carrying the thread.

69. An obturating device according to claim 68, wherein the skirt is mounted onto the body and has, in order to transmit to the body the force of application of the free edge of the skirt against the peripheral region of the orifice, a shoulder facing away from the free edge and bearing against a corresponding shoulder of the body, whereby the skirt functions as a tubular spacer between the shoulder of the body and the peripheral region of the orifice.

70. An obturating device according to claim 69, wherein the shoulder of the body is part of a collar and the skirt has a crimping lip folded down over the collar on a side thereof which is remote from the shoulder of the body.

71. An obturating device according to claim 70, wherein the locking member integral in rotation with the orifice is a ring fixed in a recess formed around the orifice.

72. An obturating device comprising;
a plug intended to be placed on a threaded orifice or to be removed therefrom, by screwing and unscrewing respectively, comprising a body carrying a thread; and
locking and unlocking means opposing spontaneous unscrewing of the plug, which are activated automatically by rotation of the plug and its corresponding progression in an axial direction of the thread;
wherein the locking and unlocking means comprise;
a first locking member which is integral in rotation with the orifice and which is a ring secured in a recess formed around the orifice; and a second locking member which is integral in rotation with the plug.

73. An obturating device according to claim 72, wherein said locking and unlocking means are reversible ratchet engagement means.

74. An obturating device according to claim 73, wherein the two locking members are positioned such that they axially mesh with one another when the plug closes the orifice, under a thrust produced by a return means urging the second locking member towards the first locking member.

75. An obturating device according to claim 73, wherein when the plug is in the locked and screwed-in state, the reversible ratchet engagement means define, by their axial meshing, a first mutual bearing opposing spontaneous unscrewing by mutual engagement of two contact faces inclined at a first angle which is relatively large, but less than 90°, with respect to a radial plane, and a second mutual bearing, tending to oppose additional screwing, by mutual engagement of two ramps inclined at a second angle with respect to the radial plane, said second angle being smaller than the first angle.

76. An obturating device according to claim 72, wherein said first locking member comprises an annular set of teeth which are oriented substantially axially.

77. An obturating device according to claim 72, wherein the second locking member is urged by return means towards the first locking member, and is guided with respect to the thread of the plug by guidance means which are located apart from the said associated thread.

78. An obturating device according to claim 77, wherein the body of the plug is axially aligned with a male threaded portion provided with the thread, such that the body is outside of the orifice when the plug is in the closed position with respect to the orifice.

79. An obturating device according to claim 77, wherein the return means is a coil spring fitted around the body between a shoulder and the second locking member, and wherein said second locking member is ring-shaped.

80. An obturating device according to claim 77, wherein for its sliding guidance and its rotational connection, the second locking member comprises, at an end remote from the orifice, keys engaged in grooves formed in the body.

81. An obturating device according to claim 72, wherein the plug comprises a skirt externally surrounding said second locking member which is integral in rotation with the plug, and return means urging said second locking member towards the orifice, and wherein the skirt has a radially inwardly directed rim limiting axial translation, under the thrust of the return means, of the second locking member.

82. An obturating device according to claim 81 wherein, when the plug is screwed in, a free edge of the skirt comes into a substantially sealing contact with a peripheral region of the orifice in such a way as to enclose the locking and unlocking means.

83. An obturating device according to claim 81, wherein the rim is produced by plastically deforming a free edge of the skirt after fitting the return means against an end shoulder of the skirt followed by fitting of said second locking member in such a way as to form a subassembly which is then attached to a central body of the plug by an end of the skirt which is remote from its free edge.

84. An obturating device according to claim 72, wherein the plug comprises a skirt of which, when the plug is screwed in, a free edge comes into a substantially sealing contact with a peripheral region of the orifice in such a way as to enclose the locking and unlocking means.

85. An obturating device according to claim 72, wherein the plug comprises a skirt of which a free edge is tightened in abutment against a peripheral region of the orifice when the plug is in the screwed-in state.

86. An obturating device comprising a plug intended to be placed on a threaded orifice or to be removed therefrom, by screwing and unscrewing respectively, comprising a body carrying a thread and reversible ratchet engagement means opposing spontaneous unscrewing of the plug, which are activated automatically by rotation of the plug and its corresponding progression in an axial direction of the thread, wherein:

said reversible ratchet engagement means comprise two locking members, which are integral in rotation with the plug and with the orifice respectively, and wherein these two locking members are positioned such that they axially mesh with one another when the plug closes the orifice, under a thrust produced by a return means urging a first of these locking members towards the other, the return means is a coil spring borne by the plug and fitted around the body of the plug between a shoulder thereof and the locking member which is integral in rotation with the plug, the return means applies an axial force towards the inside of the orifice on the locking member which is integral in rotation with the plug, and the locking member integral in rotation with the plug is ring-shaped and is slidingly guided over the body of the plug, with which the thread is integral, the body and the locking member integral in rotation with the plug being furthermore provided with means of mutual connection in rotation.

87. An obturating device according to claim 86, wherein the locking member integral in rotation with the plug is guided with respect to the body of the plug by guidance means which are located apart from said associated thread.

88. An obturating device according to claim 86, wherein the body of the plug is axially aligned with a male threaded portion provided with the thread, such that the body is outside of the orifice when the plug is in the closed position with respect to the orifice.

89. An obturating device according to claim 86, wherein for its sliding guidance and its rotational connection, the locking member integral in rotation with the plug comprises, at an end remote from the orifice, keys engaged in grooves formed in the body.

90. An obturating device according to claim 86, wherein the plug comprises a skirt externally surrounding the locking member integral in rotation with the plug and the return means, and wherein the skirt has a radially inwardly directed rim limiting axial translation, under the thrust of the return means, of the locking member integral in rotation with the plug.

91. An obturating device according to claim 90 wherein, when the plug is screwed in, a free edge of the skirt comes into a substantially sealing contact with a peripheral region of the orifice in such a way as to enclose the locking members.

92. An obturating device comprising a plug intended to be placed on a threaded orifice or to be removed therefrom, by screwing and unscrewing respectively, comprising a body carrying a thread and reversible ratchet engagement means opposing spontaneous unscrewing of the plug, which are activated automatically by rotation of the plug and its corresponding progression in an axial direction of the thread, wherein said reversible ratchet engagement means comprise two locking members, which are integral in rotation with the plug and with the orifice respectively, and wherein these two locking members are positioned such that they axially mesh with one another when the plug closes the orifice, under a thrust produced by a return means urging the locking member integral in rotation with the plug towards the locking member integral in rotation with the orifice, wherein the return means is borne by the plug and applies an axial force towards the inside of the orifice on the locking member integral in rotation with the plug; wherein the locking member integral in rotation with the plug comprises, at an end remote from the orifice, keys engaged in grooves formed in the body, whereby the plug and the locking member integral in rotation with the plug are connected for common rotation and whereby the locking member integral in rotation with the plug is slidingly guided over the body of the plug.

93. An obturating device according to claim 92, wherein said grooves are formed apart from the thread of the plug.

94. An obturating device according to claim 92, wherein the plug comprises a skirt externally surrounding the locking member integral in rotation with the plug and the return means, and wherein the skirt has a radially inwardly directed rim limiting axial translation, under the thrust of the return means, of the locking member integral in rotation with the plug.

95. An obturating device according to claim 92, wherein the plug comprises a skirt of which, when the plug is screwed in, a free edge comes into a substantially sealing contact with a peripheral region of the orifice in such a way as to enclose the locking members.

96. An obturating device according to claim 92, wherein the plug comprises a skirt having a free edge which is tightened in abutment against a peripheral region of the orifice when the plug is in the screwed-in state.

97. An obturating device according to claim 92, wherein the thread is a male thread and the locking members are arranged in an annular cavity between the skirt and a central threaded portion of the plug, carrying the thread.

* * * * *